United States Patent
Sasaki

(10) Patent No.: US 8,786,921 B2
(45) Date of Patent: Jul. 22, 2014

(54) IMAGE FORMING APPARATUS AND SYSTEM CONFIGURED TO PERFORM COLOR CORRECTION BASED ON MEDIUM TYPE

(75) Inventor: Tatsunori Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/436,365

(22) Filed: Mar. 30, 2012

(65) Prior Publication Data

US 2012/0257258 A1 Oct. 11, 2012

(30) Foreign Application Priority Data

Apr. 8, 2011 (JP) ................................ 2011-086750

(51) Int. Cl.
*G03F 3/08* (2006.01)

(52) U.S. Cl.
USPC ............................. 358/518; 358/1.9; 358/504

(58) Field of Classification Search
CPC . H04N 1/6033; H04N 1/6097; H04N 1/6058; H04N 1/60; H04N 1/6027; H04N 1/6011; H04N 1/00002; H04N 1/6052; H04N 1/4078; H04N 2201/00082
See application file for complete search history.

(56) References Cited

U.S. PATENT DOCUMENTS

| | | | | |
|---|---|---|---|---|
| 5,282,046 A * | 1/1994 | Yamaguchi | ................... | 358/296 |
| 6,351,320 B1 * | 2/2002 | Shin | ................ | 358/1.9 |
| 6,473,197 B1 * | 10/2002 | Shimazaki | ..................... | 358/1.9 |
| 6,995,855 B2 * | 2/2006 | Nagasaka | ..................... | 358/1.15 |
| 7,145,677 B2 * | 12/2006 | Shimbori et al. | ............ | 358/1.15 |
| 8,213,026 B2 | 7/2012 | Sugiyama | | |
| 8,474,942 B2 * | 7/2013 | Kawai | ............................ | 347/19 |
| 8,543,855 B2 | 9/2013 | Moloney | | |
| 8,570,541 B2 | 10/2013 | Nakamura | | |
| 8,629,992 B2 * | 1/2014 | Kawaura | ..................... | 358/1.13 |
| 8,713,341 B2 | 4/2014 | Utoh | | |
| 2005/0088710 A1 * | 4/2005 | Nakayama | .................... | 358/518 |
| 2007/0019258 A1 * | 1/2007 | Hattori | ......................... | 358/518 |
| 2008/0180715 A1 * | 7/2008 | Kawaura | ..................... | 358/1.13 |
| 2009/0016749 A1 * | 1/2009 | Mashiba | ........................ | 399/39 |

(Continued)

FOREIGN PATENT DOCUMENTS

JP 2003-345572 A 12/2003

OTHER PUBLICATIONS

U.S. Appl. No. 13/357,583, filed Jan. 24, 2012, Applicant: Tatsunori Sasaki.

(Continued)

*Primary Examiner* — Dung Tran
(74) *Attorney, Agent, or Firm* — Fitzpatrick, Cella, Harper & Scinto

(57) ABSTRACT

Upon receiving information that indicates the type of printing medium from an information processing apparatus, a printing apparatus determines whether a parameter corresponding to the type of printing medium indicated by the information is stored. When it is determined that the parameter is stored, the printing apparatus transmits the parameter to the information processing apparatus. The information processing apparatus performs color correction for image data using the parameter received from the printing apparatus. The information processing apparatus transmits the color-corrected image data to the printing apparatus, and the printing apparatus prints an image based on the color-corrected image data.

11 Claims, 5 Drawing Sheets

(56) References Cited

U.S. PATENT DOCUMENTS

| | | |
|---|---|---|
| 2012/0002220 A1 | 1/2012 | Zhan |
| 2012/0030491 A1 | 2/2012 | Itou |
| 2012/0081768 A1* | 4/2012 | Iguchi et al. ............ 358/518 |
| 2012/0257224 A1* | 10/2012 | Sasaki ..................... 358/1.9 |
| 2013/0265604 A1 | 10/2013 | Yokoyama |
| 2013/0278958 A1 | 10/2013 | Kuwahara |
| 2014/0036293 A1 | 2/2014 | Cheng |
| 2014/0118779 | 5/2014 | Ito |

OTHER PUBLICATIONS

U.S. Appl. No. 13/421,765, filed Mar. 15, 2012, Applicant: Tatsunori Sasaki.

* cited by examiner

IMAGE FORMING APPARATUS AND SYSTEM CONFIGURED TO PERFORM COLOR CORRECTION BASED ON MEDIUM TYPE

BACKGROUND OF THE INVENTION

1. Field of the Invention

The present invention relates to a print system which prints an image based on image data having undergone color correction processing, a printing apparatus used in the print system, a printing method, and a storage medium storing a program.

2. Description of the Related Art

It has conventionally been known that the density and tint in color reproduction by a color printing apparatus are greatly affected by individual characteristics of each printing apparatus, use conditions such as room temperature and the elapsed time, the type of paper serving as a printing medium, and the like. For this reason, the printing apparatus outputs test pattern data of a reference color onto a printing medium for use before outputting an actual image. Then, image data undergoes color correction based on color correction data which is the result of measuring the color of the output test pattern using a colorimeter. More specifically, color correction data read by the colorimeter is transmitted to a host apparatus (for example, PC) serving as an image output source. The host apparatus calculates a color correction parameter based on a comparison difference from an ideal value using a multi-dimensional lookup table. The host apparatus executes color correction for actual output image data using the calculated color correction parameter so that an output color in the printing apparatus coincides with a display color in the host apparatus. Then, the host apparatus transmits the actual output image data to the printing apparatus, and the printing apparatus outputs it, implementing color reproduction in output.

However, executing a series of operations for color correction in every image output which places importance on color reproduction wastes consumables such as ink for an inkjet method or toner for an electrophotographic method though the type of consumables changes depending on the image forming method. Further, output and color measurement of a test pattern take a predetermined time, decreasing the use efficiency of the whole printing apparatus. To solve these problems, color correction data is stored in the printing apparatus together with time information. The same color correction data is kept used until the lapse of a predetermined time, a change of the use condition such as a change of room temperature, a change of the paper type, or the like. There is also proposed a print system in which color correction data is stored not in a printing apparatus but in a host apparatus which has output the color correction data (Japanese Patent Laid-Open No. 2003-345572).

In Japanese Patent Laid-Open No. 2003-345572, the printing apparatus stores information for specifying a host apparatus which has acquired color correction data. When another host apparatus requests color correction, the color correction data is acquired using the host specifying information from the host apparatus which exists on the same line and stores the color correction data. This technique can omit a series of operations for color correction, and implement color correction even in a host-based driven printing apparatus having a small storage area.

However, this technique does not consider the time taken to acquire color correction data by the host apparatus and calculate a correction parameter based on a comparison difference from an ideal value. A low-processing-speed host apparatus may take time for the calculation processing, decreasing the processing efficiency of the print system.

SUMMARY OF THE INVENTION

An aspect of the present invention is to eliminate the above-mentioned problems with the conventional technology. The present invention provides a print system which improves the efficiency of print processing, a printing apparatus used in the print system, a printing method, and a storage medium storing a program.

The present invention in its first aspect provides a print system comprising an information processing apparatus and a printing apparatus which prints an image on a printing medium based on image data transmitted from the information processing apparatus, the printing apparatus including: a storage unit configured to store a parameter for performing color correction corresponding to a type of the printing medium for the image data, and the type of the printing medium in correspondence with each other; a reception unit configured to receive information indicating the type of the printing medium from the information processing apparatus; a determination unit configured to determine, based on the information received from the information processing apparatus, whether the storage unit stores the parameter corresponding to the type of the printing medium indicated by the information; a parameter transmission unit configured to transmit the parameter to the information processing apparatus when the determination unit determines that the storage unit stores the parameter; and a printing unit configured to print the image based on the image data that has undergone the color correction and has been received from the information processing apparatus, and the information processing apparatus including: a transmission unit configured to transmit the information indicating the type of the printing medium to the printing apparatus; a color correction unit configured to perform the color correction for the image data using the parameter received from the printing apparatus; and an image data transmission unit configured to transmit the image data having undergone the color correction by the color correction unit to the printing apparatus.

The present invention in its second aspect provides a printing method executed in a print system including an information processing apparatus and a printing apparatus which includes a storage unit that stores a parameter for performing color correction corresponding to a type of a printing medium for image data, and the type of the printing medium in correspondence with each other, and which prints an image on the printing medium based on the image data transmitted from the information processing apparatus, comprising: a transmission step of transmitting information indicating the type of the printing medium to the printing apparatus; a reception step of receiving information indicating the type of the printing medium from the information processing apparatus; a determination step of determining, based on the information received from the information processing apparatus, whether the storage unit stores the parameter corresponding to the type of the printing medium indicated by the information; a parameter transmission step of transmitting the parameter to the information processing apparatus when the storage unit is determined in the determination step to store the parameter; a color correction step of performing the color correction for the image data using the parameter received from the printing apparatus; an image data transmission step of transmitting the image data having undergone the color correction in the color correction step to the printing apparatus; and a printing step of printing the image based on the image data that has undergone the color correction and has been received from the information processing apparatus.

The present invention in its third aspect provides a printing apparatus which prints an image on a printing medium based on image data transmitted from an information processing apparatus, comprising: a storage unit configured to store a parameter for performing color correction corresponding to a type of the printing medium for the image data, and the type of the printing medium in correspondence with each other; a reception unit configured to receive information indicating the type of the printing medium from the information processing apparatus; a determination unit configured to determine, based on the information received from the information processing apparatus, whether the storage unit stores the parameter corresponding to the type of the printing medium indicated by the information; a parameter transmission unit configured to transmit the parameter to the information processing apparatus when the determination unit determines that the storage unit stores the parameter; and a printing unit configured to print the image based on the image data that has undergone the color correction and has been received from the information processing apparatus.

The present invention in its fourth aspect provides a printing method executed in a printing apparatus which includes a storage unit that stores a parameter for performing color correction corresponding to a type of a printing medium for image data, and the type of the printing medium in correspondence with each other, and which prints an image on the printing medium based on the image data transmitted from an information processing apparatus, comprising: a reception step of receiving information indicating the type of the printing medium from the information processing apparatus; a determination step of determining, based on the information received from the information processing apparatus, whether the storage unit stores the parameter corresponding to the type of the printing medium indicated by the information; a parameter transmission step of transmitting the parameter to the information processing apparatus when the storage unit is determined in the determination step to store the parameter; and a printing step of printing the image based on the image data that has undergone the color correction and has been received from the information processing apparatus.

The present invention in its fifth aspect provides a computer-readable storage medium storing a program for causing a computer to function as a reception step of receiving information indicating a type of a printing medium from an information processing apparatus, a determination step of determining, based on the information received from the information processing apparatus, whether a storage unit which stores a parameter for performing color correction corresponding to the type of the printing medium for image data, and the type of the printing medium in correspondence with each other stores a parameter corresponding to the type of the printing medium indicated by the information, a parameter transmission step of transmitting the parameter to the information processing apparatus when the storage unit is determined in the determination step to store the parameter, and a printing step of printing the image based on the image data that has undergone the color correction and has been received from the information processing apparatus.

The present invention can improve the efficiency of print processing.

Further features of the present invention will become apparent from the following description of exemplary embodiments with reference to the attached drawings.

DESCRIPTION OF THE EMBODIMENTS

Figure 1:
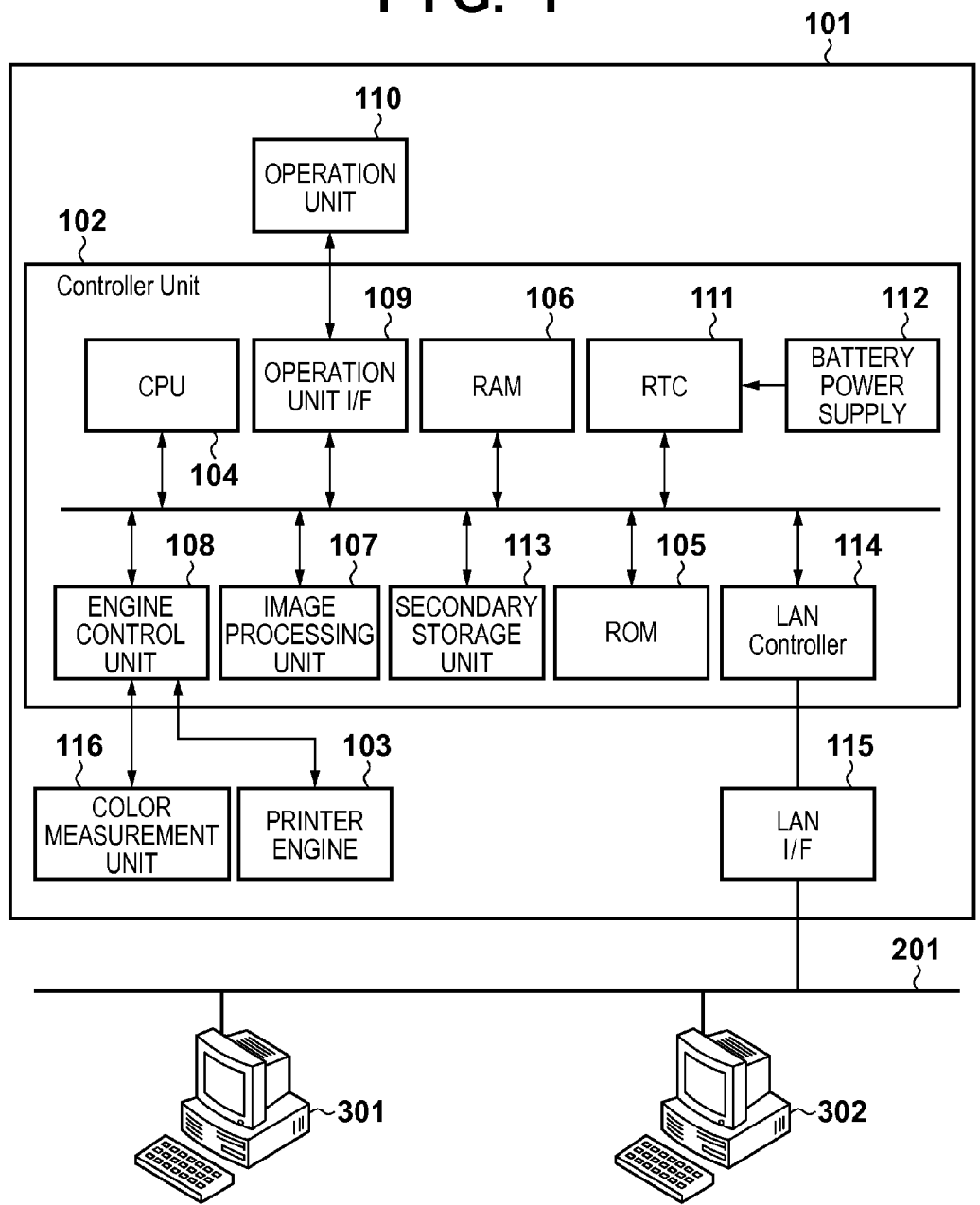
FIG. 1 is a block diagram showing the arrangement of a printing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[First Embodiment]

Figure 2:
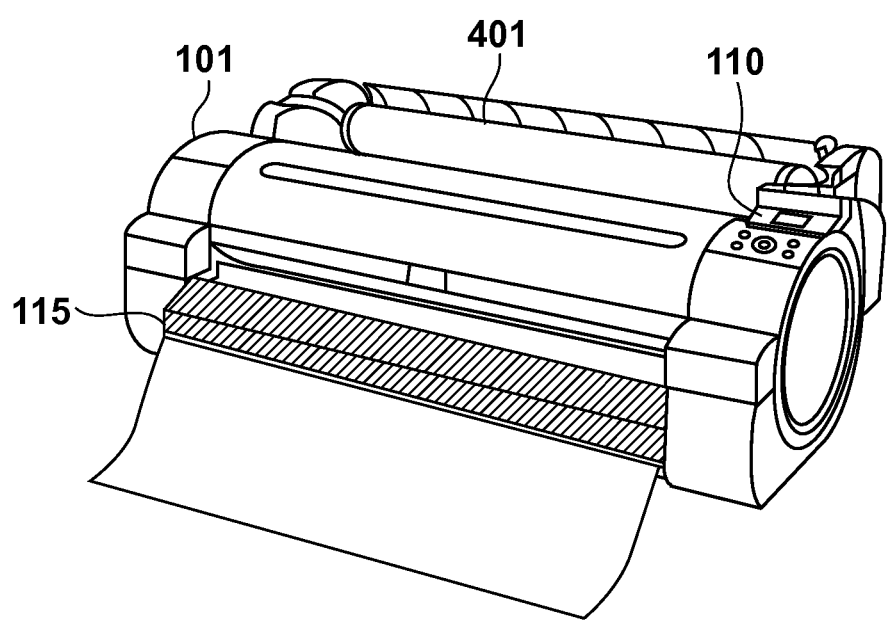
FIG. 2 is a perspective view showing the outer appearance of the printing apparatus.

FIG. 1 is a block diagram showing the arrangement of a printing apparatus according to the first embodiment of the present invention. FIG. 2 is a perspective view showing the outer appearance of a printing apparatus 101 in the embodiment. In the embodiment, a color printer using an inkjet printing method will be exemplified as the printing apparatus 101.

A controller unit 102 in the printing apparatus 101 is connected to a printer engine 103 and color measurement unit (colorimeter) 116. A CPU 104 controls the whole printing apparatus 101 based on a system control program. A ROM 105 stores the system control program serving as a control program for the whole printing apparatus 101. A RAM 106 is a data readable/writable RAM, and the system control program in the ROM 105 is expanded and stored in the RAM 106. The RAM 106 is used even as a buffer memory for storing data before and after image processing by an image processing unit 107. The image processing unit 107 performs color space processing, gamma correction processing, quantization processing based on an error diffusion method, and the like for image data saved in the RAM 106 in accordance with an instruction from the CPU 104, and generates binary data which can be output from the printer engine 103. An engine control unit 108 controls the printer engine 103, and transfers image data processed by the image processing unit 107 to the printer engine 103. The engine control unit 108 includes a connection interface with the color measurement unit 116. The engine control unit 108 controls the operation of the color measurement unit 116, receives color correction data from the color measurement unit 116, and transfers data to the RAM 106.

The printer engine 103 includes a printhead for forming an image by discharging ink onto a printing medium, a paper conveyance motor for conveying paper serving as a printing medium, and a carriage motor for scanning the printhead in a direction perpendicular to the paper conveyance direction (none are shown). In the embodiment, roll paper 501 is used as paper serving as a printing medium, and conveyed to the color measurement unit 116 after image formation by the printer engine 103. The printer engine 103 includes various error detection sensors and the like (not shown), and operates them under the control of the engine control unit 108. The engine control unit 108 drives the printhead, paper conveyance motor, and carriage motor in synchronism with each other, and fixes ink discharged from the printhead at a desired position on paper, forming a desired image on the paper.

The color measurement unit 116 includes a color measurement sensor, and a driving motor for scanning the color measurement sensor in a direction perpendicular to the paper conveyance direction (none are shown). The color measurement unit 116 measures the color of a test pattern output using the printer engine 103, and generates color correction data. The CPU 104 stores the color correction data in a secondary storage unit 113. Note that paper conveyance when performing color measurement by the color measurement unit 116 uses the paper conveyance motor of the printer engine 103, and is executed under the control of the engine control unit 108.

An operation unit I/F 109 is an interface with an operation unit 110, and outputs, to the display unit of the operation unit 110, image data which is stored in the ROM 105, is rasterized in the RAM 106, and is to be displayed on the operation unit 110. The operation unit I/F 109 notifies the CPU 104 of information input by the user using the input function of the operation unit 110. The operation unit 110 has an input function of inputting settings from the user to the printing apparatus 101, and a display function of displaying a notification from the printing apparatus 101 to the user. The operation unit 110 is used to present information to the user and input an instruction. In the embodiment, when setting paper used for output in the printing apparatus 101, the user selects and registers the type and size of set paper via the operation unit 110.

A real-time clock (RTC) 111 has a timepiece function, and measures and stores date & time information necessary for the printing apparatus 101. The RTC 111 is connected to a battery power supply 112 parallel to a power supply used inside the apparatus. Even when the power supply of the printing apparatus 101 is OFF, the battery power supply 112 allows continuing the operation of the RTC 111 to prevent measurement stop or erase of date & time information. The secondary storage unit 113 is connected to a nonvolatile hard disk drive (HDD) using a magnetic recording method. In the embodiment, the secondary storage unit 113 has two areas. One is a user data storage area which stores image data in accordance with user designation and can output an image in accordance with image data designation using the operation unit 110 without using a host apparatus 301. The other is a system area which stores the processing parameters of the printing apparatus 101 and the like. In the embodiment, the color correction parameter is stored in the system area of the secondary storage unit 113 in correspondence with a set of information about a paper type used in color measurement, and information about the date & time when color measurement was executed that is acquired from the RTC 111.

A LAN controller 114 controls a LAN interface 115. Since the CPU 104 executes register setting and data input/output control, a control program for the LAN controller 114 is stored in advance in the ROM 105. The LAN interface 115 is connected to the host apparatus 301 and a host apparatus 302 via a LAN 201. The LAN interface 115 receives job data and transmits status information of the printing apparatus 101. Note that the LAN 201 and LAN interface 115 are configured according to, for example, the Ethernet® interface standard.

The host apparatuses 301 and 302 are connected to the LAN or network 201, and are general personal computers or the like. Driver software which sets and manages printing of the printing apparatus 101 runs on each of the host apparatuses 301 and 302. The driver software executes even color space conversion and gamma correction processing regarding color reproduction of an output image. The driver software executes even creation of test pattern data, reception of color correction data, and calculation of color correction parameter values from the received color correction data to replace table values in color space conversion, gamma correction, and the like in the embodiment.

Figure 3:
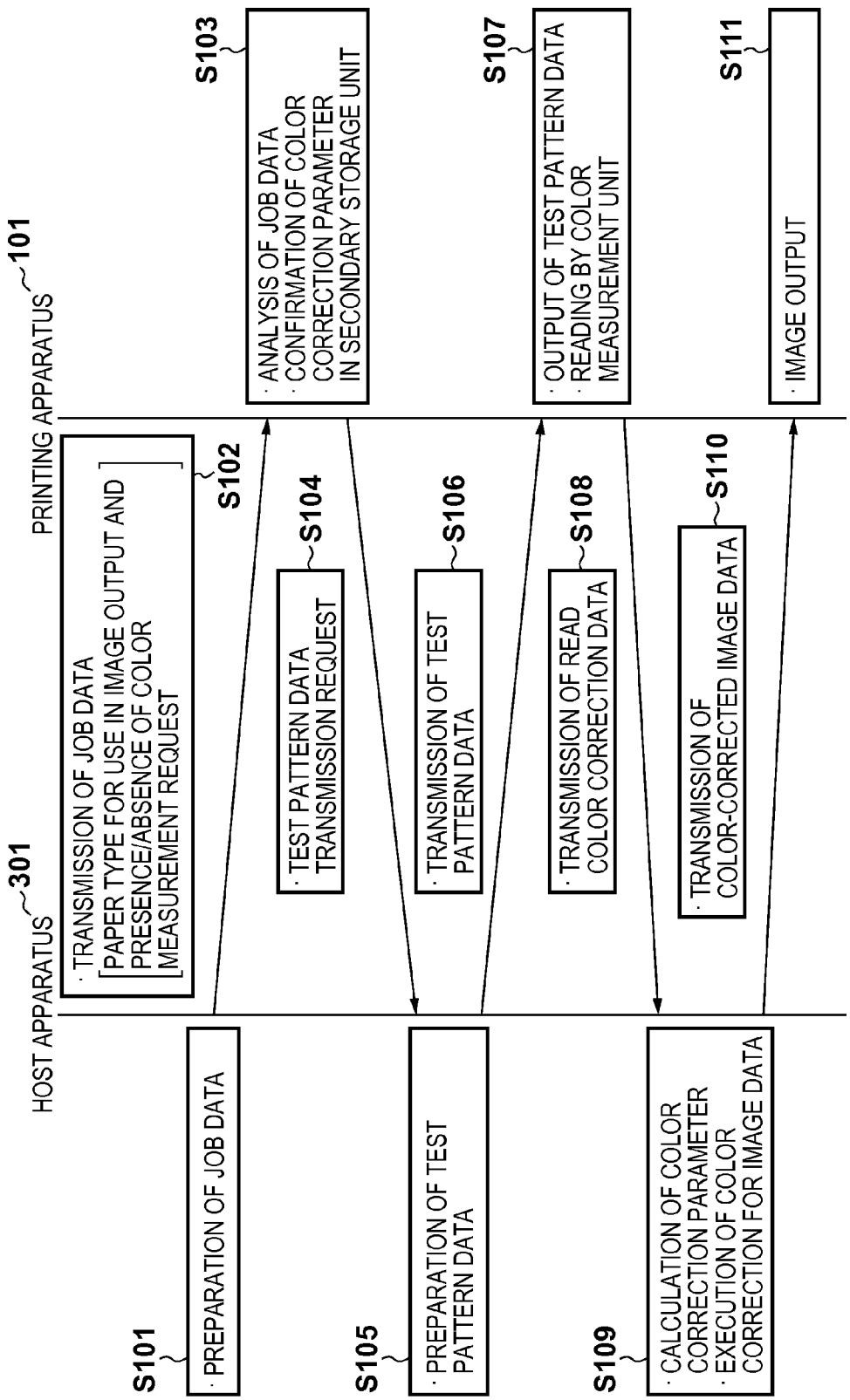
FIG. 3 is a chart showing a sequence to transmit/receive data between the printing apparatus and a host apparatus.

A sequence to newly acquire color correction data in accordance with a color correction data acquisition request between the printing apparatus 101 and the host apparatus 301 will be explained with reference to FIG. 3. FIG. 3 is a chart showing a transmission/reception sequence between the printing apparatus 101 and the host apparatus 301. When the user inputs an output instruction via the host apparatus 301 with image output designation which places importance on color reproduction, the host apparatus 301 prepares for data to be transmitted as job data to the printing apparatus 101 (step S101). In the embodiment, designation of whether to place importance on color reproduction is based on the presence/absence of designation in a check box on the driver software. Upon completion of job data preparation, the host apparatus 301 transmits job data to the printing apparatus 101. The job data contains information about a paper type for use in output (printing) and information about the presence/absence of a color measurement request, which can be identified by the printing apparatus 101 (step S102). Upon receiving the job data, the printing apparatus 101 analyzes the job data, identifies the presence/absence of a color measurement request, and determines whether the secondary storage unit 113 stores a color correction parameter matching the paper type information contained in the job data. If the printing apparatus 101 determines that the secondary storage unit 113 does not store the target color correction parameter, it issues a test pattern data transmission request to the host apparatus 301 (step S104).

Upon receiving the transmission request from the printing apparatus 101, the host apparatus 301 prepares for test pattern data held in the driver software (step S105), and transmits it to the printing apparatus 101 (step S106). The printing apparatus 101 outputs the received test pattern data, reads the output test pattern using the color measurement unit 116 (step S107), and transmits the reading result as color correction data to the host apparatus 301 (step S108). Upon receiving the color correction data, the host apparatus 301 calculates a color correction parameter from a comparison difference between the color correction data and an ideal value on the driver software. The host apparatus 301 performs color correction processing for output image data so that an output color in the printing apparatus 101 coincides with a display color in the host apparatus 301 (step S109). Then, the host apparatus 301 transmits the color-corrected image data to the printing apparatus 101 (step S110). The printing apparatus 101 outputs the received color-corrected image data, and the process ends (step S111).

Figure 4:
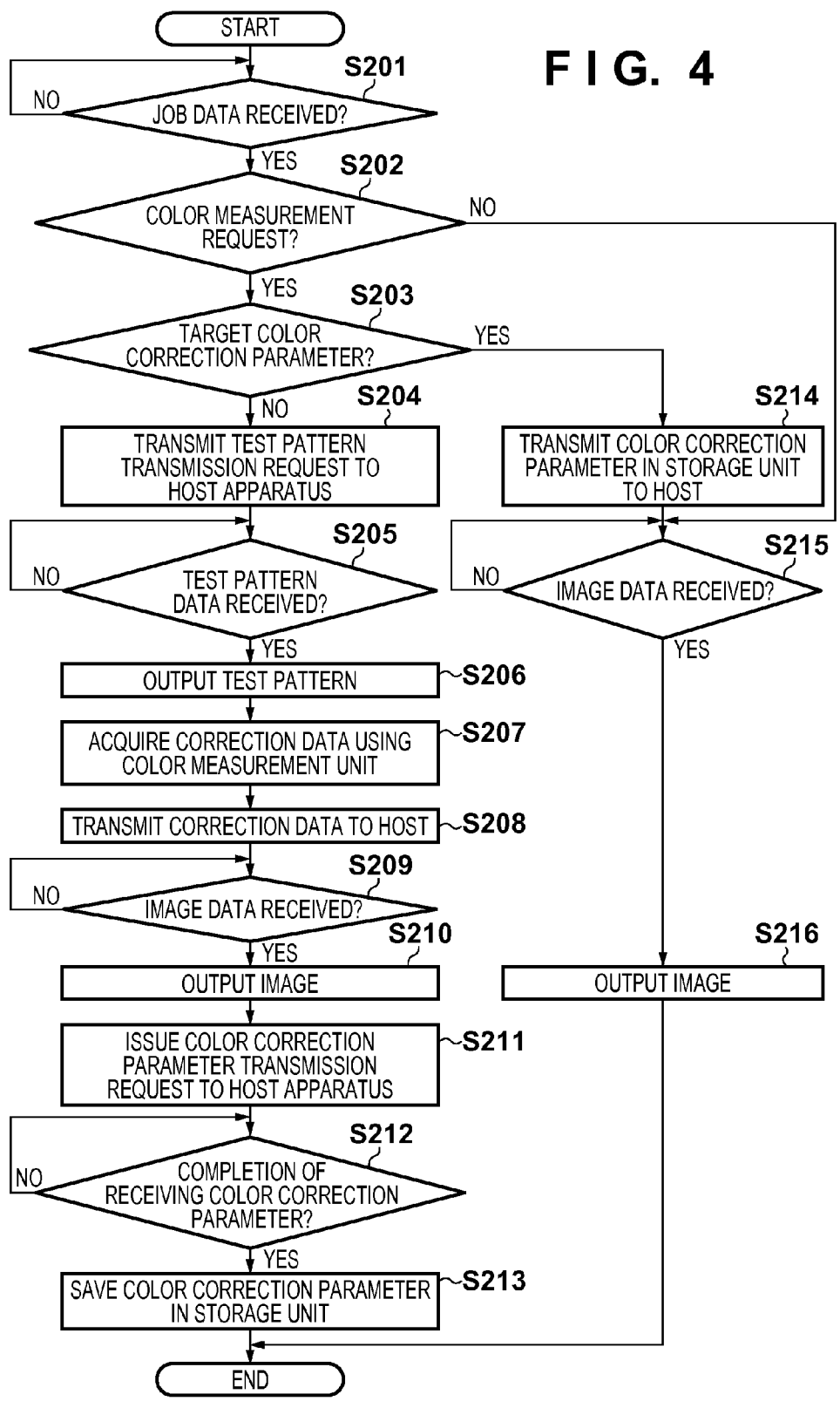
FIG. 4 is a flowchart showing a processing sequence when the printing apparatus receives job data.

A processing sequence when the printing apparatus 101 outputs an image upon receiving job data, and stores a color correction parameter in the embodiment will be explained with reference to FIG. 4. FIG. 4 is a flowchart showing a processing sequence when the printing apparatus 101 receives job data. In step S201, the printing apparatus 101 receives job data from the host apparatus 301. Then, the CPU 104 analyzes the received job data, and identifies paper type information for use in image output (printing) and the presence/absence of a color measurement request (step S202). If the job data does not contain a color measurement request as a result of the identification, the CPU 104 starts receiving image data (step S215). Upon completion of buffering and image processing for image data of a line free from any trouble such as a stop during output, image output starts (step S216). After the end of outputting all image data, the process ends. In the embodiment, the job data contains printing designation information such as the type and size of paper for use in printing. Before the start of image output, the CPU 104 confirms whether the printing designation information matches a paper type and size set by the user via the operation unit 110 of the printing apparatus 101. If the confirmation result is a mismatch, the CPU 104 uses the display of the operation unit 110 to prompt the user to change paper. The CPU 104 waits till the completion of the change without starting image output. However, the CPU 104 keeps receiving image data and stores them in the secondary storage unit 113.

If the job data contains a color measurement request as a result of the identification in step S202, the CPU 104 determines, based on the paper type information, whether the secondary storage unit 113 stores the matching color correction parameter (step S203). In this case, the CPU 104 acquires date & time information from the RTC 111, and compares it with the color correction parameter acquisition date & time accessory to the color correction parameter stored in the secondary storage unit 113. As for a color correction parameter for which a predetermined period has elapsed, the CPU 104 determines a mismatch. This can cope with even a change of the use environment. If the CPU 104 determines in step S203 that the secondary storage unit 113 stores the matching color correction parameter, it reads out the target color correction parameter from the secondary storage unit 113. Then, the CPU 104 transmits the color correction parameter to the host apparatus 301 serving as a job data transmission source via the LAN interface 115 and LAN 201 (step S214). Upon receiving the color correction parameter, the host apparatus 301 performs color correction for image data to be output on the driver software by gamma correction and color space conversion to which the color correction parameter is applied, so that an output color in the printing apparatus 101 coincides with a display color in the host apparatus 301. The printing apparatus 101 waits for transmission of color-corrected image data from the host apparatus 301 (step S215). Upon receiving color-corrected image data, the printing apparatus 101 outputs all image data, similar to printing in which no color correction data need be acquired (step S216). After that, the process ends.

A case in which it is determined in step S203 that the secondary storage unit 113 does not store a color correction parameter which matches a paper type in printing designation information and falls within a predetermined period after the acquisition date & time will be explained by referring again to step S203. In this case, the printing apparatus 101 requests the host apparatus 301 to transmit a test pattern (step S204). Upon receiving the transmission request, the host apparatus 301 transmits test pattern data to the printing apparatus 101 to acquire color correction data prepared in advance by the driver software. The printing apparatus 101 waits for reception of test pattern data (step S205). After the end of receiving the test pattern data, the printing apparatus 101 outputs the test pattern on paper serving as a printing medium by using the printer engine 103 in accordance with the received test pattern data (step S206).

Similar to normal image data output, it is confirmed whether the paper matches a paper type and size set by the user via the operation unit 110 of the printing apparatus 101, so that the test pattern is output on desired paper. Upon completion of outputting the test pattern, the paper bearing the test pattern is placed on the reading unit including the color measurement sensor of the color measurement unit 116 by using the paper conveyance motor of the printer engine. The color measurement unit 116 drives the color measurement sensor arranged to scan in a direction perpendicular to the paper conveyance direction, reads the test pattern on the paper, and transfers the reading result as color correction data (color measurement data) to the CPU 104 via the engine control unit 108 (step S207).

Upon receiving the color correction data, the CPU 104 transmits the color correction data to the host apparatus 301 serving as a job data transmission source via the LAN interface 115 and LAN 201 (step S208). Upon receiving the color correction data, the host apparatus 301 calculates a color correction parameter based on a comparison difference between the ideal value of the test pattern stored in the driver software and the color correction data serving as the received test pattern read value. The host apparatus 301 applies the calculated color correction parameter to gamma correction and color space conversion, and performs color correction for image data to be output so that an output color in the printing apparatus 101 coincides with a display color in the host apparatus 301.

The printing apparatus 101 waits until the host apparatus 301 transmits the color-corrected image data (step S209). Upon receiving the color-corrected image data, the printing apparatus 101 outputs all image data, similar to printing in which no color correction data need be acquired (step S210). The CPU 104 requests the host apparatus 301 serving as a job data transmission source to transmit the color correction parameter used in color correction (step S211), and waits for reception of the color correction parameter (step S212). In response to this transmission request, the host apparatus 301 transmits the color correction parameter. Upon receiving the color correction parameter, the printing apparatus 101 stores the color correction parameter in the storage unit 113 in correspondence with the paper type information used in output and date & time information when the color correction parameter was received that is read from the RTC 111. The process then ends (step S213).

By the above sequence, when a condition for use in printing, for example, the paper type matches, the correction parameter is directly transmitted from the storage unit in the printing apparatus 101 to the host apparatus 301. Thus, waste of consumables by outputting a test pattern can be prevented, and the time taken to calculate a color correction parameter by the host apparatus 301 can be omitted. The whole print system can implement an efficient operation.

Also, the first embodiment can achieve the following effects. For example, in the conventional technique, a color correction parameter is stored in a host apparatus which has executed output using correction based on the color correction parameter. However, in output from another host apparatus, when the color correction parameter is to be acquired from the host apparatus which stores the color correction parameter, the host apparatus which stores the color correction parameter needs to be active in output. If the host apparatus which stores the color correction parameter always runs, power consumption increases in the print system. If the host apparatus which stores the color correction parameter is turned off when it need not be active, the following problem occurs. When another host apparatus performs output using correction based on the color correction parameter, a series of operations for color correction cannot be omitted and needs to be executed again. The host apparatus which stores the color correction parameter may shift to the power saving state in which it can return in response to a color correction parameter acquisition request. However, in this case, the print system needs to wait for the time taken to return from the power saving state, decreasing the efficiency of the whole print system.

In the first embodiment, the printing apparatus stores a color correction parameter calculated by the host apparatus. The first embodiment can prevent the above-described problems arising from the power off state and power saving state of the host apparatus.

[Second Embodiment]

As the second embodiment, processing when even version information of driver software used to calculate a color correction parameter in the host apparatus is stored in addition to paper type information which is stored in correspondence with a color correction parameter stored in a printing apparatus 101 will be explained. In general, software is easily distributed and updated via the Internet or the like. Updated data is sometimes released later for functional upgrading or bug fixing, and whether to apply the updated version depends on the user. In a system in which a plurality of host apparatuses such as host apparatuses 301 and 302 are arranged on the same network as that of the printing apparatus 101, versions of software used in the respective host apparatuses may differ from each other. In this case, the correction parameter calculation method may change for functional upgrading or bug fixing mentioned above. If color correction is executed using a color correction parameter created by software of a different version, a mismatch may occur in color reproduction.

In the second embodiment, job data transmitted from a host apparatus and an acquisition request condition stored in a secondary storage unit 113 contain software version information. In the second embodiment, not all color correction parameters are stored for respective combinations of software versions and paper type information which have been used to create color correction parameters, but only color correction parameters corresponding to limited generations, for example, the latest version are stored. Accordingly, the use area of the secondary storage unit 113 of the printing apparatus 101 can be limited, and occupation of the storage area by only color correction parameters can be prevented. A processing sequence when the printing apparatus 101 outputs an image and stores a color correction parameter upon receiving job data will be described with reference to FIG. 5.

Figure 5:
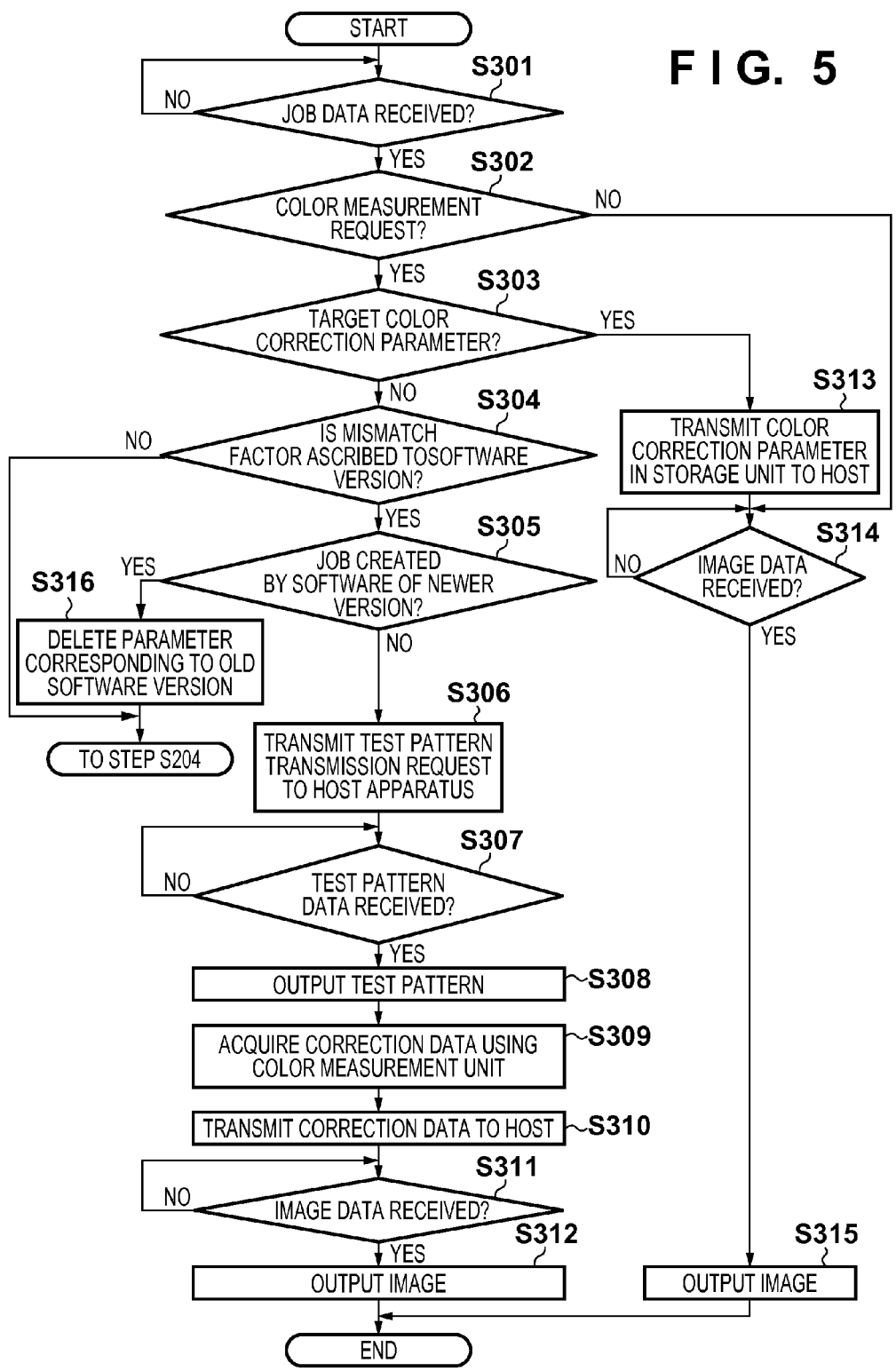
FIG. 5 is a flowchart showing another processing sequence when the printing apparatus receives job data.

FIG. 5 is a flowchart showing an operation upon receiving job data in the embodiment. In step S301, the printing apparatus 101 receives job data from the host apparatus 301. Then, a CPU 104 analyzes the received job data, and identifies paper type information for use in printing, driver software version information for use, and the presence/absence of a color measurement request (step S302). If the job data does not contain a color measurement request as a result of the identification, the CPU 104 starts receiving image data (step S314). Similar to the first embodiment, upon completion of buffering and image processing for image data of a line free from any trouble such as a stop during output, image output starts (step S315). After the end of outputting all image data, the process ends. Similar to the first embodiment, the job data contains printing designation information such as the type and size of paper for use in printing. Before the start of image output, the CPU 104 confirms whether the printing designation information matches a set paper type and size. If the confirmation result is a mismatch, the CPU 104 keeps receiving image data and stores them in the secondary storage unit 113 without outputting an image.

If the job data contains a color measurement request as a result of the identification in step S302, the CPU 104 determines, based on the paper type information by referring to color correction parameters stored in the secondary storage unit 113, whether a color correction parameter corresponding to the paper type is stored (step S303). At this time, the CPU 104 acquires date & time information from an RTC 111, and compares it with the color correction parameter acquisition date & time accessory to the color correction parameter stored in the secondary storage unit 113. As for a color correction parameter for which a predetermined period has elapsed, the CPU 104 determines a mismatch. Note that determination of a matching color correction parameter in step S303 uses the above-described paper type information and software version information contained in the job data. If the CPU 104 determines that a color correction parameter matching the condition is stored, it reads out the target color correction parameter from the secondary storage unit 113, and transmits it to the host apparatus 301 via a LAN interface 115 and LAN 201 (step S313). Procedures till color correction processing for image data by the host apparatus 301, transmission of image data, and output are the same as those in the first embodiment.

If the CPU 104 determines in step S303 that the secondary storage unit 113 does not store the target color correction parameter, it determines whether the factor of this determination result is ascribed to the software version (step S304). If the factor is not ascribed to the software version and no matching paper type exists or a predetermined period has elapsed after the correction parameter acquisition date & time, processes in step S204 and subsequent steps described in the first embodiment are executed. When storing a color correction parameter received from the host apparatus 301 in the secondary storage unit 113 of the printing apparatus 101, software version information is stored in addition to paper type information, and date & time information when the color correction parameter was received that is read from the RTC 111.

If the CPU 104 determines in step S304 that a color correction parameter corresponding to the paper type information is stored, but the factor of storing no color correction parameter is ascribed to the software version, the software version is compared with version information contained in the received job data (step S305). If version information (first version) contained the received job data is newer than version information (second version) corresponding to the correction parameter stored in the secondary storage unit 113, the color correction parameter in the secondary storage unit 113 is deleted (step S316). Note that the color correction parameter to be deleted in step S316 is only a color correction parameter matching paper type information of the received job data. By executing processes in step S204 and subsequent steps, a color correction parameter matching a new software version can be stored.

If version information contained the received job data is older in step S305, color-corrected image data is output according to procedures in steps S306 to S312. Note that these procedures are the same as those in steps S204 to S210 in the first embodiment. Since the software version used to calculate a correction parameter in the received job data is older than a version accessory to the correction parameter stored in the secondary storage unit 113, the process ends without receiving the correction parameter and storing it in the secondary storage unit 113.

By the above sequence, the printing apparatus 101 can prevent a mismatch arising from the difference in software version used to calculate a correction parameter in the host apparatus, and limit the storage area by correction parameters. In the embodiment, correction parameters stored in the secondary storage unit 113 are those corresponding to the latest software version. When correction parameters corresponding to a plurality of versions are stored, the version comparison count in step S305 is increased. The embodiment has explained an operation from the host apparatus 301. However, even processing from the host apparatus 301 can be implemented by the same control. Even for alternate operations from the host apparatuses 301 and 302, the operation in the embodiment can be implemented by sequentially executing the same control.

In the above-described embodiments, the printing apparatus is a color printer adopting the inkjet printing method. However, the present invention is not limited to this, and the printing apparatus may be a printing apparatus adopting another printing method such as a laser beam printer, a copying apparatus, or the like. In the embodiments, whether a correction parameter is valid is determined using date & time information. However, this determination may be made based on a change around the apparatus regarding output characteristics using a temperature sensor or humidity sensor. By acquiring color correction data again in accordance with the change amount, the influence of apparatus-specific characteristics can be reduced. In the embodiments, two information processing apparatuses are connected on a communication interface. However, the print system may be configured by connecting a plurality of information processing apparatuses and a plurality of printing apparatuses.

In the second embodiment, when software version information corresponding to a color correction parameter stored in the secondary storage unit 113 is newer than version information contained in received job data, the user may be warned via the host apparatus. The user can recognize the presence of software newer in version than the driver software used by him, improving reusability of the color correction parameter.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-086750, filed Apr. 8, 2011, which is hereby incorporated by reference herein in its entirety.

What is claimed is:

1. A print system comprising an information processing apparatus and a printing apparatus which prints an image on a printing medium based on image data transmitted from the information processing apparatus, the printing apparatus comprising:
a storage unit configured to store a parameter for performing color correction corresponding to a type of the printing medium for the image data, and the type of the printing medium in correspondence with each other;
a reception unit configured to receive information indicating the type of the printing medium from the information processing apparatus;
a determination unit configured to determine, based on the information received from the information processing apparatus, whether the storage unit stores the parameter corresponding to the type of the printing medium indicated by the information;
a parameter transmission unit configured to transmit the parameter to the information processing apparatus in a case where the determination unit determines that the storage unit stores the parameter; and
a printing unit configured to print the image based on the image data that has undergone the color correction and has been received from the information processing apparatus, and the information processing apparatus comprising:
a transmission unit configured to transmit the information indicating the type of the printing medium to the printing apparatus;
a color correction unit configured to perform the color correction for the image data using the parameter received from the printing apparatus; and
an image data transmission unit configured to transmit the image data having undergone the color correction by the color correction unit to the printing apparatus.

2. The system according to claim 1, wherein
the printing apparatus further comprises:
a test pattern data request unit configured to request the information processing apparatus to transmit test pattern data to the printing apparatus in a case where the determination unit determines that the storage unit does not store the parameter;
a test printing unit configured to print a test pattern based on the test pattern data received from the information processing apparatus, and
a color measurement data transmission unit configured to measure a color of the test pattern printed by the test printing unit to acquire color measurement data, and transmit the color measurement data to the information processing apparatus,
the information processing apparatus comprises:
a test pattern data transmission unit configured to transmit the test pattern data to the printing apparatus in response to a request from the test pattern data request unit; and
a specifying unit configured to specify the parameter based on the image data and the color measurement data received from the printing apparatus, and
the color correction unit of the information processing apparatus performs the color correction for the image data using the parameter specified by the specifying unit.

3. The system according to claim 2, wherein
the printing apparatus further comprises:
a parameter request unit configured to request the information processing apparatus to transmit the parameter specified by the specifying unit to the printing apparatus,
the information processing apparatus further comprises:
a parameter transmission unit configured to transmit the parameter specified by the specifying unit to the printing apparatus in response to the request from the parameter request unit, and
the storage unit stores, in correspondence with the type of the printing medium, the parameter which has been specified by the specifying unit and received from the information processing apparatus.

4. The system according to claim 1, wherein
the parameter corresponds to a version of software for performing the color correction, and
the transmission unit transmits version information of the software to the printing apparatus together with the information indicating the type of the printing medium.

5. The system according to claim 4, wherein in a case where a first version indicated by the version information of the software received from the information processing apparatus coincides with the second version of the software corresponding to the parameter stored in the storage unit, the determination unit determines that the storage unit stores the parameter.

6. The system according to claim 5, wherein
the printing apparatus further comprises:
a comparison unit configured to, in a case where the first version indicated by the version information of the software received from the information processing apparatus does not coincide with the second version of the software corresponding to the parameter stored in the storage unit, compare the first version with the second version, and
in a case where the first version is newer than the second version as a result of comparison by the comparison unit, the test pattern data request unit deletes the parameter from the storage unit and requests the information processing apparatus to transmit test pattern data to the printing apparatus.

7. The system according to claim 6, wherein in a case where the first version is newer than the second version as a result of comparison by the comparison unit, the parameter request unit requests the information processing apparatus to transmit the parameter specified by the specifying unit to the printing apparatus.

8. A printing method executed in a print system including an information processing apparatus and a printing apparatus which includes a storage unit that stores a parameter for performing color correction corresponding to a type of a printing medium for image data, and the type of the printing medium in correspondence with each other, and which prints an image on the printing medium based on the image data transmitted from the information processing apparatus, comprising:
a transmission step of transmitting information indicating the type of the printing medium to the printing apparatus;
a reception step of receiving information indicating the type of the printing medium from the information processing apparatus;
a determination step of determining, based on the information received from the information processing apparatus, whether the storage unit stores the parameter corresponding to the type of the printing medium indicated by the information;
a parameter transmission step of transmitting the parameter to the information processing apparatus in a case where the storage unit is determined in the determination step to store the parameter;
a color correction step of performing the color correction for the image data using the parameter received from the printing apparatus;
an image data transmission step of transmitting the image data having undergone the color correction in the color correction step to the printing apparatus; and
a printing step of printing the image based on the image data that has undergone the color correction and has been received from the information processing apparatus.

9. A printing apparatus which prints an image on a printing medium based on image data transmitted from an information processing apparatus, comprising:
a storage unit configured to store a parameter for performing color correction corresponding to a type of the printing medium for the image data, and the type of the printing medium in correspondence with each other;
a reception unit configured to receive information indicating the type of the printing medium from the information processing apparatus;
a determination unit configured to determine, based on the information received from the information processing apparatus, whether the storage unit stores the parameter corresponding to the type of the printing medium indicated by the information;
a parameter transmission unit configured to transmit the parameter to the information processing apparatus in a case where the determination unit determines that the storage unit stores the parameter; and
a printing unit configured to print the image based on the image data that has undergone the color correction and has been received from the information processing apparatus.

10. A printing method executed in a printing apparatus which includes a storage unit that stores a parameter for performing color correction corresponding to a type of a printing medium for image data, and the type of the printing medium in correspondence with each other, and which prints an image on the printing medium based on the image data transmitted from an information processing apparatus, comprising:
receiving information indicating the type of the printing medium from the information processing apparatus;
determining, based on the information received from the information processing apparatus, whether the storage unit stores the parameter corresponding to the type of the printing medium indicated by the information;
transmitting the parameter to the information processing apparatus in a case where the storage unit is determined to store the parameter; and
printing the image based on the image data that has undergone the color correction and has been received from the information processing apparatus.

11. A non-transitory computer-readable storage medium storing a program for causing a computer to perform
receiving information indicating a type of a printing medium from an information processing apparatus,
determining, based on the information received from the information processing apparatus, whether a storage unit which stores a parameter for performing color correction corresponding to the type of the printing medium for image data, and the type of the printing medium in correspondence with each other stores a parameter corresponding to the type of the printing medium indicated by the information,
transmitting the parameter to the information processing apparatus in a case where the storage unit is determined in the determination step to store the parameter, and
printing the image based on the image data that has undergone the color correction and has been received from the information processing apparatus.

* * * * *